（12）United States Patent
Sim

(10) Patent No.: US 9,643,650 B2
(45) Date of Patent: May 9, 2017

(54) LANE CHANGE CONTROL DEVICE AND CONTROL METHOD

(71) Applicant: MANDO CORPORATION, Pyeongtaek-si, Gyeonggi-do (KR)

(72) Inventor: Sang Kyun Sim, Anyang-si (KR)

(73) Assignee: MANDO CORPORATION, Pyeongtaek-si, Gyeonggi-Do (KP)

( * ) Notice: Subject to any disclaimer, the term of this patent is extended or adjusted under 35 U.S.C. 154(b) by 0 days.

(21) Appl. No.: 14/983,469

(22) Filed: Dec. 29, 2015

(65) Prior Publication Data

US 2016/0185388 A1 Jun. 30, 2016

(30) Foreign Application Priority Data

Dec. 30, 2014 (KR) ........................ 10-2014-0193119

(51) Int. Cl.
*B62D 15/02* (2006.01)
*B60K 31/00* (2006.01)
*G06K 9/00* (2006.01)
*B60R 11/04* (2006.01)

(52) U.S. Cl.
CPC ...... *B62D 15/0255* (2013.01); *B60K 31/0008* (2013.01); *B60R 11/04* (2013.01); *G06K 9/00798* (2013.01); *G06K 9/00805* (2013.01); *B60R 2300/804* (2013.01); *B60R 2300/8086* (2013.01)

(58) Field of Classification Search
CPC . B62D 15/0255; B60K 31/0008; B60R 11/04; G06K 9/00798; G06K 9/00805; H04N 5/225
See application file for complete search history.

(56) References Cited

U.S. PATENT DOCUMENTS

2006/0178789 A1* 8/2006 Kuge ................... B60W 40/09
701/1
2015/0120137 A1* 4/2015 Zeng ...................... G05D 1/024
701/41

* cited by examiner

*Primary Examiner* — Yuen Wong
(74) *Attorney, Agent, or Firm* — Hauptman Ham, LLP

(57) ABSTRACT

The present disclosure relates to an automatic lane change control of a vehicle is possible using a lane change control device including: a space recognition unit that detects a front object using a camera sensor of a vehicle, recognizes an empty space, and determines a target position, within the empty space on the basis of a lane modeling equation determined from a lateral offset, the vehicle's traveling velocity (V), and a lane change request time (t); a path generation unit that generates a path for moving from a current vehicle position to the target position; and a control unit that performs a lane change control that controls at least one of the vehicle's steering angle and a vehicle velocity such that the vehicle moves to the target position along the path.

12 Claims, 15 Drawing Sheets

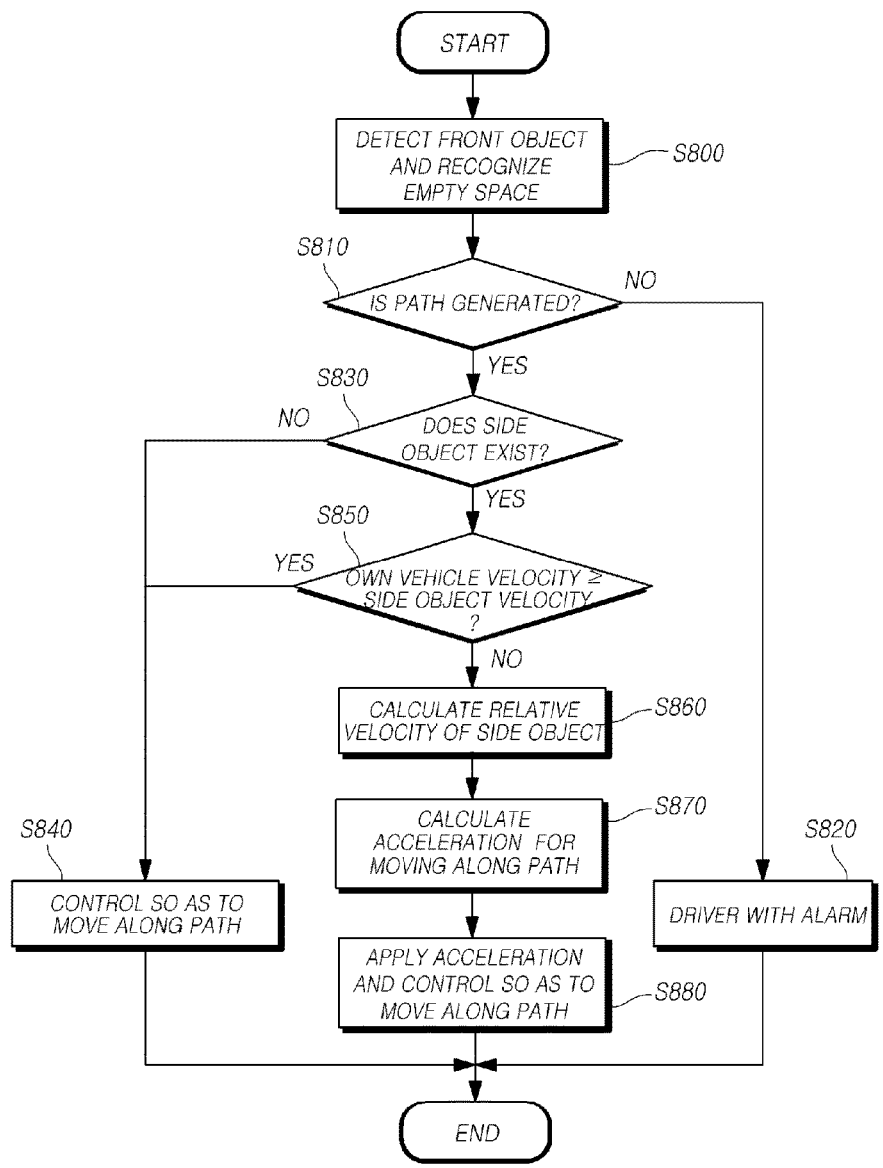

LANE CHANGE CONTROL DEVICE AND CONTROL METHOD

CROSS-REFERENCE TO RELATED APPLICATION

This application claims priority from and the benefit under 35 U.S.C. §119(a) of Korean Patent Application No. 10-2014-0193119, filed on Dec. 30, 2014, which is hereby incorporated by reference for all purposes as if fully set forth herein.

BACKGROUND OF THE INVENTION

1. Field of the Invention

The present invention relates to a technology for changing the lane, in which a vehicle is currently running. More particularly, the present invention relates to a technology for changing the lane on the basis of situations of objects in front of the vehicle.

2. Description of the Prior Art

In general, a vehicle has a camera sensor installed to recognize external objects.

Such a camera sensor can sense a wide field of view, and thereof is used as a sensor of another device.

Despite such an advantage of a wide field of view, a camera sensor, in connection with a lane change device, is only used as a sensor for sensing objects in blind spots and warning the driver.

However, there is a problem in that an attempt to change the lane by a driver, who is physically handicapped, or who has failed to recognize warnings due to peripheral situations, may lead to an accident.

On the other hand, recent use of power steering devices has made it possible to assist the driver's steering through steering motor control, or to automatically control the steering under the control of the vehicle control system's own control, regardless of the driver's intentions.

Driving assist systems (DAS) using such an automatic steering control technology includes a lane keeping assist system (LKAS) that controls a vehicle so as to keep the lane in which it is running, a lane change assist system (LCAS) that controls a vehicle to change the lane to an adjacent lane, etc.

However, there is a problem in that, unlike the lane keeping assist system, which recognizes a lane and controls the vehicle so as not to deviate from the lane through steering control, operation of the lane change control system requires complicated processes of monitoring the situation of an adjacent lane, to which the current lane is to be changed, setting a path for the lane change, and performing a vehicle velocity or steering angle control.

Furthermore, there is a danger of, for example, collision with another vehicle, which is running in an adjacent lane, during the process of lane change control. Therefore, a precise lane change control is required.

SUMMARY OF THE INVENTION

In the above-mentioned background, an aspect of the present invention is to provide a device and a method for recognizing the situation on the road, using a camera sensor, and controlling the vehicle so as to change the lane.

Another aspect of the present invention is to provide a device and a method for determining the position of an empty space inside an adjacent line, to which the current line is to be changed, using a camera sensor, setting the path of vehicle movement (lane change path) to the position of the empty space, and controlling the velocity, acceleration, and steering angel of the vehicle so as to move along the path.

According to an aspect, the present invention provides a lane change control device including: a space recognition unit that detects a front object using a camera sensor of a vehicle and recognizes an empty space, in which the front object does not exist; a path generation unit that generates a path, along which the vehicle can move to the empty space, on the basis of the vehicle's width, length, and maximum steering angle information; and a control unit that controls the vehicle so as to move along the generated path.

According to another aspect, the present invention provides a lane change control method including: a space recognition step of detecting a front object using a camera sensor of a vehicle and recognizing an empty space, in which the front object does not exist; a path generation step of generating a path, along which the vehicle can move to the empty space, on the basis of the vehicle's width, length, and maximum steering angle information; and a control step of controlling the vehicle so as to move along the generated path.

As described above, the present invention is advantageous in that the situation on the road, on which a vehicle is running, is recognized using a camera sensor of the vehicle, and the lane is changed on the basis of the recognized situation, thereby providing the driver with safety.

BRIEF DESCRIPTION OF THE DRAWINGS

The above and other objects, features and advantages of the present invention will be more apparent from the following detailed description taken in conjunction with the accompanying drawings, in which:

FIG. 8 is a diagram for describing the overall operation according to an embodiment of the present invention;

DETAILED DESCRIPTION OF THE EXEMPLARY EMBODIMENTS

Hereinafter, some of embodiments of the present invention will be described in detail with reference to the exemplary drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component. It is to be noted that, in connection with naming of elements, "own vehicle" and "vehicle" refer to the same element.

Figure 1:
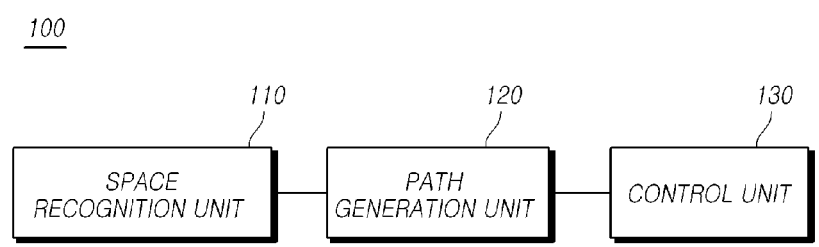
FIG. 1 is a diagram illustrating the configuration of a lane change device according to an embodiment of the present invention.

FIG. 1 is a diagram illustrating the configuration of a lane change device according to an embodiment of the present invention.

The lane change device according to an embodiment of the present invention may include a space recognition unit that detects a front object using a camera sensor of the vehicle and recognizes an empty space, in which no front object exists; a path generation unit that generates a path, along which the vehicle can move to the empty space, on the basis of the vehicle's width, length, and maximum steering angle information; and a control unit that controls the vehicle so that the vehicle moves along a detected path. The space recognition unit, the path generation unit, and the control unit are hardware units.

Referring to FIG. 1, the lane change device 100 according to an embodiment of the present invention may include a space recognition unit 110 that detects a front object using a camera sensor of the vehicle and recognizes an empty space, in which no front object exists.

For example, the space recognition unit 110 may detect a front object using a front camera, which is provided on the vehicle, and may obtain the distance to the front object. In addition, the space recognition unit 110 may recognize an empty space, in which no object exists, using a detected front object and information regarding the distance to the front object.

To be specific, among two front cameras provided on the vehicle, one camera may be used to acquire information regarding the front in the lateral direction, and the other camera may be used to acquire information regarding the front in the longitudinal direction. The acquired information regarding the front in the lateral and longitudinal directions may be combined to detect an object, and the position and distance of the object may be obtained. By obtaining the position and distance of all objects existing in the monitoring area in front of the vehicle, instead of only one object, it becomes possible to detect not only a front object existing in the same traveling lane, but also a front/side object existing in the front of an adjacent traveling lane, so that an empty space in the front of the adjacent traveling lane can also be recognized. The above-mentioned empty space is an area that may vary depending on the position of the two front cameras provided on the vehicle, and is not limited to the empty spaced illustrated in the drawings.

In contrast, a conventional lane change device acquires lateral direction information using radar and acquires longitudinal direction information using a camera sensor. The conventional lane change device can detect an object by combining the lateral direction information and the longitudinal direction information and can detect the position and distance of the detected object, in the same manner as described above. However, the lateral direction information obtained using radar has a narrow monitoring space, unlike the lateral direction information obtained using a camera; as a result, only a front object existing in the same lane can be recognized, and any front/side object existing in the front of an adjacent traveling lane cannot be recognized. As such, the conventional lane change device has a limitation in that no empty space in the front of an adjacent traveling lane can be recognized.

On the other hand, in order for the space recognition unit 110 according to the present invention to determine a target position in an empty space existing in an adjacent lane, a lane modeling equation, which is related to the own vehicle and the current traveling lane, and the distance of longitudinal movement (x0), which is determined from the current vehicle velocity (v) and the lane change completion request time (t), may be used, as will be described in more detail with reference to FIG. 11.

Specifically, assuming that the direction of traveling of the own vehicle is X-axis, and a direction perpendicular to the same is Y-axis, the space recognition unit 110 may analyze an image taken of an adjacent lane, determine the coordinate of an empty space, in which no obstacle exists, among spaces of the adjacent lane, and determine a specific target position (x0, y0) in the empty space using a lane modeling equation, which is related to the current traveling lane, and the distance of longitudinal movement (x0), which is determined from the current vehicle velocity (v) and the lane change completion request time (t). The configuration of the space recognition unit 110 for determining an empty space or a specific target position in the empty space will hereinafter be further described with reference to FIG. 11.

It is to be noted that, in this specification, an empty space in an adjacent lane, which has been sensed from an image taken by a camera in order to perform a lane change control, and a target position, which is a position in the empty space determined as the final target of lane change, are used to denote the same concept.

Figure 11:
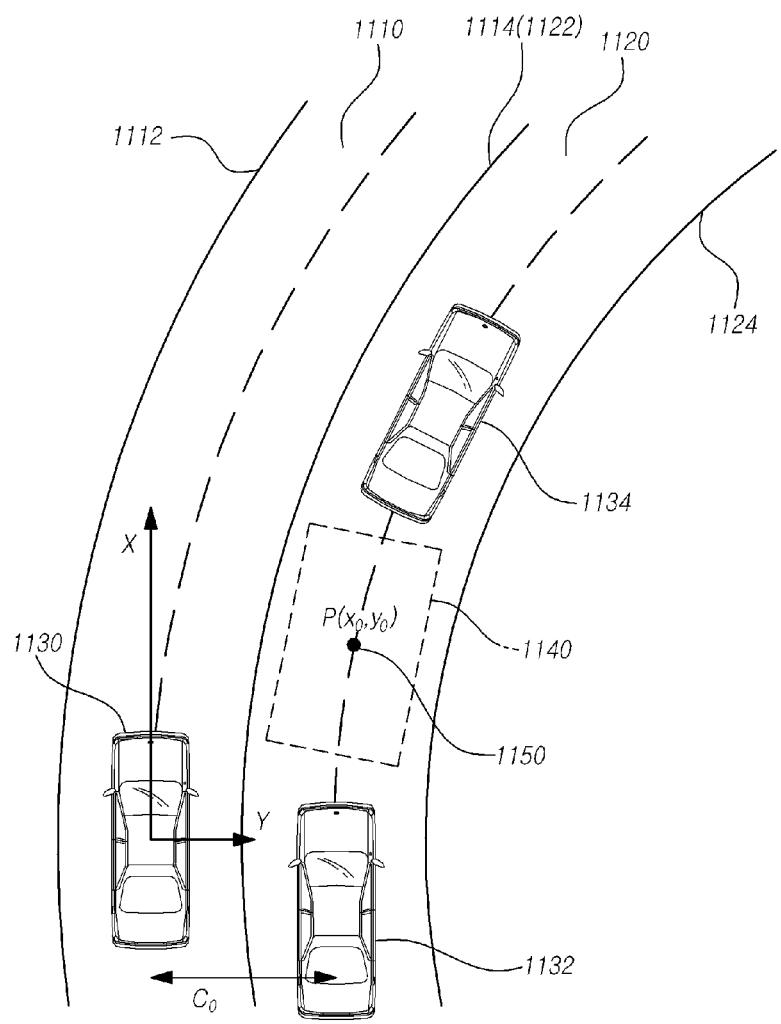
FIG. 11 illustrates a scheme of determining the position of an empty space inside an adjacent lane by a space recognition unit of a lane change device according to an embodiment of the present invention.

FIG. 11 illustrates a scheme of determining the position of an empty space in an adjacent lane or a target position by a space recognition unit of a lane change device according to an embodiment of the present invention.

As illustrated in FIG. 11, a lane in which the own vehicle 11330 is running is denoted by a traveling lane 1110, an adjacent lane in a direction, in which a lane change is to be made, is denoted by an adjacent lane 1120, and it is assumed that two other vehicles 1132 and 1134 are running in the adjacent lane 1120.

It is also assumed that the forward traveling direction of the own vehicle 1130 is X-axis, a direction perpendicular to the same is Y-axis, and these X-Y axes constitute a reference coordinate system.

In this situation, a space recognition unit included in a lane change device according to the present invention specifies X-Y coordinates of the other vehicles 1132 and 1134, which are obstacles, from images taken by one or more front cameras.

An empty space 1140, in which no obstacle exists, then can be recognized, and the space recognition unit 110 determines a specific position P, in the empty space area, as the final target position, to which a lane change is to be made.

In this case, the final target position P(x0, y0) can be determined from a lane modeling equation, which expresses lanes in the above-mentioned X-Y coordinate system, the vehicle velocity (V), and the lane change request time (t).

First, the lane modeling equation can be determined as in equation (1) below:

$$y=C_0+C_1x+C_2x^2+C_3x^3 \tag{1}$$

In equation (1), $C_0$ refers to a lateral offset coefficient, which is a distance between the camera center of the vehicle 1130 and the center of an adjacent lane; $C_1$ refers to a lane heading angle coefficient; $C_2$ refers to a lane curvature coefficient; and $C_3$ refers to a lane curvature derivative coefficient.

By analyzing images taken by cameras of the vehicle, the lateral offset, which is a distance between the camera center of the vehicle 1130 and the center of an adjacent lane, can be measured, and this value becomes the lateral offset coefficient, $C_0$.

On the other hand, differentiating the lateral offset, $C_0$, yields the lane heading angle, which becomes the lane heading angle coefficient, $C_1$.

Differentiating the lane heading angle $C_1$ once or differentiating the lateral offset $C_0$ twice yields the lane curvature, and ½ of the lane curvature becomes the lane curvature coefficient, $C_2$.

In addition, differentiating the lane curvature once determines the lane curvature derivative, and ⅙ of the lane curvature derivative becomes the lane curvature derivative coefficient, $C_3$.

As described above, the size of lateral offset, which is the distance between the camera center of the vehicle 1130 and the center of an adjacent lane, is measured through images taken by cameras, so that a lane modeling equation in a X-Y coordinate system, which considers the vehicle's running direction as a reference, can be determined as in equation (1).

More specifically, a lane modeling equation, such as equation (1), expresses a center line of an adjacent lane in the X-Y coordinate system.

After the lane modeling equation is determined, the space recognition unit 110 can determine a specific position in an adjacent as the target position P for lane change using the lane modeling equation and the positions of other vehicles 1132 and 1134, which are obstacles, in taken images.

That is, there may be multiple empty spaces, in which no obstacles exist, in taken images, but the target location for lane change control according to the present invention is supposed to exist in an adjacent lane among the same, which is why a lane modeling equation is used as described above.

On the other hand, assuming that the coordinate of the target position P is (x0, y0), the target position can be determined by the vehicle velocity V and the lane change request time t.

Specifically, assuming that the current vehicle position is the origin, the distance of movement of the vehicle in the longitudinal direction (X-axis direction) until the lane change is completed (i.e. until the target position is reached) can be determined as a product of the vehicle velocity v and the lane change request time t, and this value is the X coordinate of the target position, $x_0$.

In addition, the target position P comes to be in the center position of an adjacent lane; therefore, when the X coordinate of the target position, $x_0$, is determined, it can be substituted in the lane modeling equation to obtain the Y coordinate of the target position P, $y_0$.

As such, the space recognition unit 110 according to the present invention can determine the target position, i.e. the final empty space to which the vehicle is to move, using a lane modeling equation, which is determined from the distance between the camera center of the vehicle 1130 and the center of an adjacent lane (i.e. lateral offset), the vehicle's running velocity V, and the lane change request time t.

On the other hand, the lane change request time t refers to a time taken to complete a lane change starting from the current point of time, and may have been set in advance.

Alternatively, in some cases, the lane change request time may have been set differently for respective steps, and the driver may select one therefrom.

For example, assuming that the lane change request time has been set in three steps of three seconds, five seconds, and ten seconds, the case of three seconds corresponds to an early mode, in which a lane change is completed most rapidly, the case of five seconds corresponds to a normal mode, and the case of ten seconds corresponds to a late mode, so that the driver can determine the mode in advance.

The lane change device 100 according to an embodiment of the present invention may include a path generation unit 120 that generates a path, along which the vehicle can move to an empty space, on the basis of the vehicle's width, length, and maximum steering angle information.

For example, the path generation unit 120 may generate a path, along which the vehicle can move to an empty space, if the width of an empty space between a detected front object and a detected front/side object is larger than the width of the vehicle. In addition, the path generation unit 120 may generate a path, along which the vehicle can move to an empty space, if an empty space between the own vehicle and a detected front object is large enough to avoid overlapping between the radius of rotation of the front wheels of the own vehicle and the front object. The radius of rotation of the front wheels of the vehicle is information related to the steering angle of the own vehicle. Furthermore, the path generation unit 120 may generate a path, along which the vehicle can move to a empty space, if an empty space between the own vehicle and a detected front/side object is large enough to avoid overlapping between the radius of rotation of rear wheels of the own vehicle and the side object. The radius of rotation of rear wheels of the own vehicle is information related to the steering angle of and length of the own vehicle.

The lane change device 100 according to an embodiment of the present invention may include a control unit 130 that controls the vehicle so as to move along a path, which has been generated by the path generation unit 120.

For example, the control unit 130 may calculate a steering angle on the basis of a detected path, may calculate a steering torque on the basis of the corresponding steering angle, and may control the own vehicle so as to move along the detected path using the calculated steering angle and the steering torque. A brief description is as follows: the position of an empty space recognized by the space recognition unit 110 varies depending on the movement of the own vehicle, and the real-time position of the own vehicle can be estimated using the varied position of the empty space. In addition, the control unit 130 may compare the estimated real-time position and the detected path and may control the own vehicle using the steering angle and steering torque of the corresponding position so that the own vehicle can move along the path.

In addition, a path generated by the path generation unit 120 may be a path formed along a straight line between the current vehicle position and the target position, i.e. the position of an empty space to which the vehicle is to move finally.

Figure 12:
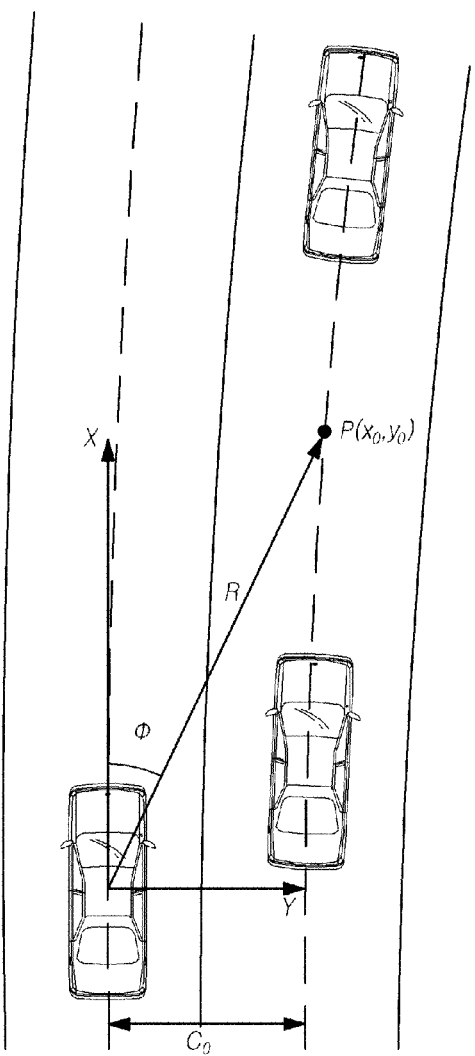
FIG. 12 illustrates an example of generating a path to an empty space by a path generation unit of a lane change device according to an embodiment of the present invention.

FIG. 12 illustrates an example of generating a path to an empty space by a path generation unit of a lane change device according to an embodiment of the present invention.

When the position of an empty space, to which the vehicle is to move (target position P) is determined on the basis of a lane modeling equation, vehicle velocity V, and lane change request time t, as in FIG. 11, a vehicle movement path from the current vehicle position to the position of the empty space is determined.

In this case, all kinds of trajectories connecting the current position and the target position P may be possible, but the present invention uses a path, along which the vehicle moves in a straight line from the current position to the target position P.

Specifically, as in FIG. 12, a path for lane change may be determined as in equation (2) below:

$$y = C_0 + C_1 x \quad (2)$$

wherein, $C_0$ is a lateral offset, which is a distance between the camera center of the vehicle 1130 and the center of an adjacent lane, as described above, and $C_1$ is a lane heading angle, which can be calculated by differentiating the lateral offset $C_0$.

In this specification, on the other hand, the lane heading angle $C_1$ is defined as an angle between a tangent of a lane and X-axis, and a vehicle heading angle, which is a concept distinguished from the same, is indicated by $\phi$.

When a path expressed by equation (2) is determined as described above, the control unit 130 controls the vehicle's engine, the steering device, and the like so that the vehicle moves along the path.

Specifically, the control unit adjusts the vehicle velocity and acceleration through engine control, adjusts the vehicle heading angle by controlling the steering device, and thereby controls the vehicle so as to move from the current position to the target position within the lane change request time t.

More specifically, the control unit 130 may set the vehicle velocity and acceleration according to the relative velocity between the own vehicle and another vehicle existing in an adjacent lane, to which a lane change is to be made.

For example, when another vehicle on a side/rear part of a lane, to which a lane change is to be made, runs slower than the own vehicle so that the relative velocity, which is defined as "own velocity vehicle−another vehicle velocity" has a positive (+) value, the current velocity may be maintained, and the acceleration may be set to zero.

In contrast, when the other vehicle runs faster the own vehicle so that the relative velocity has a negative (−) value, the acceleration may be set so that the vehicle velocity increases in proportion to the magnitude of the relative velocity.

In addition, the control unit 130 controls the steering device, thereby varying the steering angle, and thus controls the vehicle so as to follow the path.

The steering device includes, in general, a steering wheel, a steering shaft connected to the steering wheel, a rack bar gear-coupled to an end of the steering shaft, and wheels connected to both ends of the rack bar via a tie rod. When the steering shaft rotates by a predetermined amount, the wheels rotate in proportion to the same, thereby conducting steering.

In this case, the angle of rotation of the steering wheel or the steering shaft becomes the steering angle $\theta$, and the ratio between the amount of rotation $\theta$ of the steering wheel and the amount of rotation $\delta$ of the wheels, which follows the same, can be expressed as a steering gear ratio $\zeta$.

In this environment, the control unit 130 determines the target steering angle $\epsilon fb$ at every point of time, in order for the vehicle to move along the path, by equation (3) below:

$$\theta_{fb} = \zeta \delta_{fb} = [k_{v1}e_{\hat{y}} + k_{v2}\dot{e}_{\hat{y}} + k_{v3}e_{\hat{\phi}} + k_{v4}\dot{e}_{\hat{\phi}}] + k_{v5}e_y \quad (3)$$

In equation (3) above, $\theta_{fb}$ refers to a target steering angle; $\delta_{fb}$ refers to a road steering angle; y refers to the amount of lateral offset of the vehicle with regard to the path; $\phi$ refers to a vehicle heading angle with regard to the path; $e_{\hat{y}}$ refers to a front predicted lateral offset error; $e_y$ refers to a lateral offset error at the current point of time; and $e_{\hat{\phi}}$ refers to a front predicted heading angle error.

As in equation (3), the target steering angle $\theta_{fb}$ can be calculated by a proportional control, which is proportional to the front predicted lateral offset error $e_{\hat{y}}$ and the front predicted heading angle error $e_{\hat{\phi}}$, and a proportional differential feedback control, to which a differential control that differentiates the former and generates a control signal is connected in parallel, i.e. through PD control scheme.

In equation (3), $k_{v1}$-$k_{v5}$ are adaptive gains related to the vehicle velocity, and have been determined in advance as tuning parameters.

On the other hand, when the escapement angle, which is defined as an angle between the path and the current vehicle traveling direction (X-axis direction), is almost zero, as in equation (3), the control unit 130 may additionally feedback a lateral offset error $e_y$ of the current point of time, instead of the front predicted lateral offset error $e_{\hat{y}}$, which is a predicted error at a future point of time, in order to maintain a predetermined level of correction angle with regard to the lateral offset.

As described above, the control unit 130 adjusts the vehicle velocity or acceleration according to the relative velocity with regard to another adjacent vehicle through engine control so that the vehicle can change lanes along a generated path, and feedback-controls the target steering angle through steering device control.

In addition, when a target steering angle $\theta_{fb}$ is determined, a steering torque is calculated using a steering angle-steering torque map, and a motor current value is then determined, which is to be applied to a steering motor.

Applying the determined motor current to the steering motor performs automatic steering as much as the target steering angle, thereby conducting steering control for lane change.

On the other hand, the control unit 130 may perform a control for limiting the maximum steering angle according to the vehicle velocity, as will be described later, may set a maximum lateral acceleration or a maximum longitudinal acceleration, and may guarantee that the lane change control is conducted only within the range.

In addition, the control unit 130 may set a predetermined lane change control entry condition and may guarantee that a lane change control is performed only when the control entry condition is satisfied.

In addition, the control unit 130 may continuously monitor the lateral distance to a side object, during a lane change control, and may release the lane change control when the side object approaches. Alternatively, the control unit 130 may set a specific lane change control release condition and may perform a control for releasing (ending) the lane change control when the control release condition is satisfied.

An embodiment, which considers the control entry condition, the control release condition, etc., will be described later in more detail with reference to FIG. 10.

Figure 2:
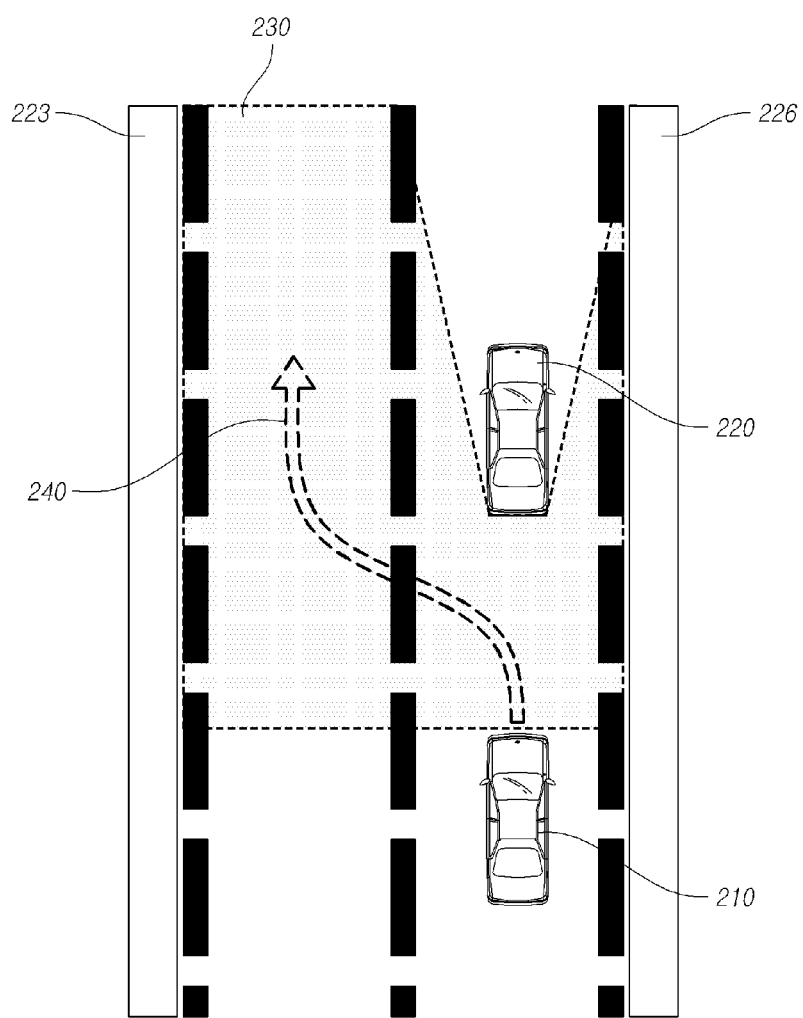
FIG. 2 is a diagram illustrating an example for describing the operation of a vehicle according to an embodiment of the present invention.

FIG. 2 is a diagram illustrating an example for describing the operation of a vehicle according to an embodiment of the present invention.

Referring to FIG. 2, two vehicles 210 and 220 are running on a secondary traveling road of a two-lane road, on which a median strip 223 and a guard rail 226 are installed, and the vehicle 210 is attempting a lane change to the primary traveling road. A lane change device according to an embodiment of the present invention will now be described: the space recognition unit can acquire lateral direction information and longitudinal direction information using a camera sensor provided on the vehicle, and, by combining the lateral direction information and longitudinal direction information, can detect the vehicle 220, which is a front object, and the median strip 223 and the guard rail 226, which are front/side objects. Thereafter, the space recognition unit can recognize an empty space 230 by excluding areas covered by the front object 220 and the front/side objects 223 and 226, which have been detected from the area that can be monitored using the camera sensor. The path generation unit can generate a path 240, along which the vehicle can move to the recognized empty space 230, on the basis of information regarding the vehicle's width, length, and the radius of rotation.

Figure 3A:
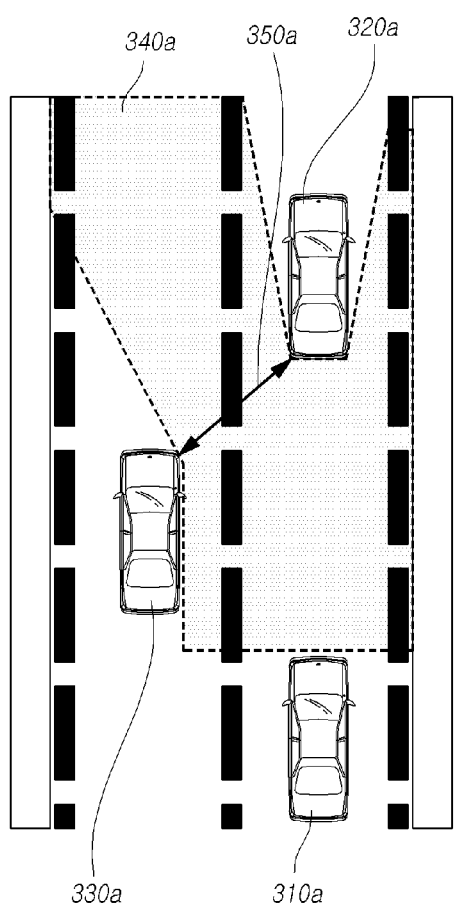
FIG. 3A to FIG. 3C are diagrams illustrating examples for describing the operation of a path generation unit according to an embodiment of the present invention.
Figure 3B:
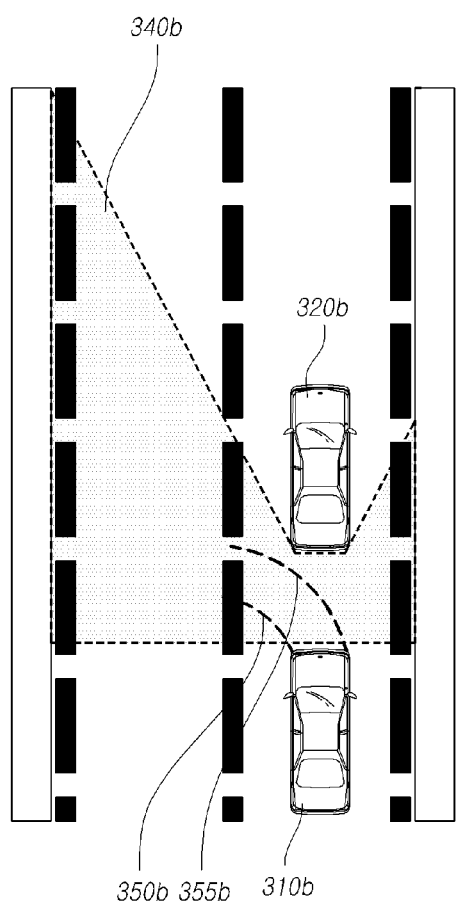
Figure 3C:
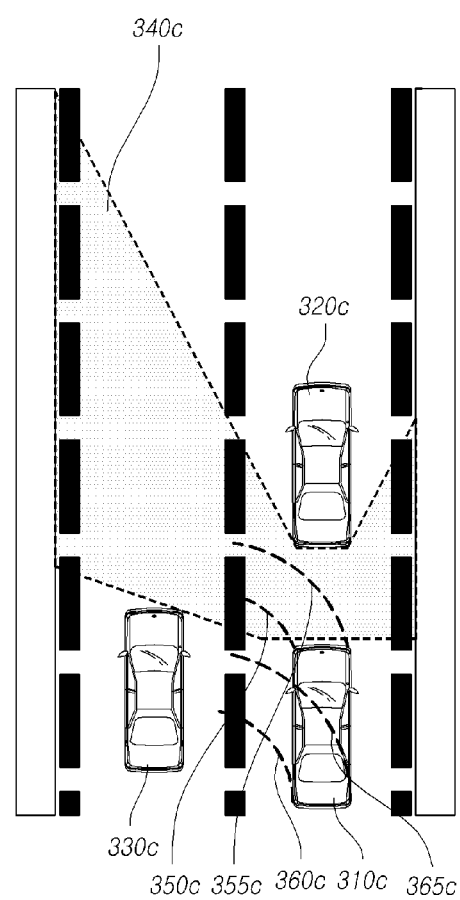

FIG. 3A to FIG. 3C are diagrams illustrating examples for describing the operation of a path generation unit according to an embodiment of the present invention.

FIG. 3A to FIG. 3C illustrate three cases that can be encountered when a vehicle 310, which is running on a secondary traveling road of a two-lane road that has a median strip and a guard rail installed thereon, attempts a lane change to a primary traveling road. In the case of FIG. 3A, two vehicles 320a and 330a are positioned on the secondary and primary traveling roads, respectively, and are running ahead of the vehicle 310a. The two vehicles 320a and 330a maintain an interval 350a. The vehicle 310a then can recognize an empty space 340a. In the case of FIG. 3B, one vehicle 320b is positioned on the secondary traveling road and is running ahead of the vehicle 310b. The vehicle 310b then can recognize an empty space 340b. The vehicle 310b has a minimum radius of rotation 350b of the left front wheel and a minimum radius of rotation 355b of the right front wheel, which depend on the maximum steering angle. In the case of FIG. 3C, two vehicles 320c and 330c are positioned on the secondary and primary traveling roads, respectively, and are running ahead of the vehicle 310c. The vehicle 310c then can recognize an empty space 340c. In addition, the vehicle 310c has a minimum radius of rotation 350c of the left front wheel, a minimum radius of rotation 355c of the right front wheel, a minimum radius of rotation 360c of the left rear wheel, and a minimum radius of rotation 365c of the right rear wheel, which depend on the maximum steering angle. The above-mentioned radii of rotation are values related to the size of circles when objects make circular movements. For example, when a circle has a small size, the radius of rotation has a small value; when the circle is large, the radius of rotation has a large value. A vehicle makes the smallest circular movement when running at the maximum steering angle, meaning that it has the minimum radius of rotation in the case of the maximum steering angle.

Specifically, the above-mentioned minimum radius of rotation may mean a movement of the vehicle 310 at the maximum steering angle, which can be manipulated by the vehicle 310. It is also be noted that the reason the radii of rotation in the leftward direction only are used in FIG. 3A to FIG. 3C is because the vehicle 310 is changing lanes from the secondary traveling road to the primary traveling road; therefore, if the vehicle 310 is to change lanes to the right lane, instead of the left lane, a radius of rotation in the rightward direction needs to be used.

Referring to FIG. 3A, the path generation unit according to an embodiment of the present invention can generate a path, along which the vehicle can move to an empty space 340a on the primary traveling road, on the basis of vehicle width information. Specifically, the path generation unit can generate a path, along which the vehicle can move to an empty space, only when the interval 350a is larger than the width of the vehicle 310a. The interval 350a may mean the minimum interval that enables the vehicle to change lanes to the primary traveling road without colliding with the two vehicles 320a and 330a. The path generation unit may be set to generate a path only when the interval 350a is at least a specific multiple of the width of the vehicle 310a, by considering safety. The specific multiple is a value that can be calculated by experiment-based data.

Referring to FIG. 3B, the path generation unit according to an embodiment of the present invention can generate a path, along which the vehicle can move to an empty space 340b, on the basis of the vehicle's maximum steering angle information. Specifically, the path generation unit can generate a path, along which the vehicle can move to an empty space 340b on the primary traveling road, only when the minimum radius of rotation 355b of the right front wheel of the vehicle 310b, which is moving at the maximum steering angle, exists within the empty space 340b. If the minimum radius of rotation 355b exists outside the empty space 340b, unlike the case of FIG. 3B, a lane change by the vehicle 310b will lead to a collision with the preceding vehicle 320b. Therefore, the path generation unit can prevent a lane change-related accident by generating a path, along which the vehicle can move, on the basis of information regarding the minimum radius of rotation at the maximum steering angle of the vehicle.

Referring to FIG. 3C, the path generation unit according to an embodiment of the present invention can generate a path, along which the vehicle can move to an empty space 340c, on the basis of the vehicle's length and the vehicle's maximum steering angle information. The minimum radii of rotation 360c and 365c of the rear wheels of the vehicle are related not only to the vehicle's maximum steering angle, but also the vehicle's length. This means that, even if a vehicle having a large length and a vehicle having a small length are operated at the same steering angle by steering gears, the radius of rotation of the rear wheels of the longer vehicle is larger than the radius of rotation of the rear wheels of the shorter vehicle. This fact can be verified by experiences. The path generation unit can generate a path, along which the vehicle can move to an empty space 340c on the primary traveling road, when the minimum radius of rotation 355c of the right front wheel of the vehicle 310c is included inside the empty space 340c, and when the minimum radius of rotation 360c of the left rear wheel does not overlap with the vehicle 330c. It will be assumed that, while the minimum radius of rotation 355c of the right front wheel is positioned inside the empty space 340c, and the radius of rotation 360c of the left rear wheel overlaps with the adjacent vehicle 330c: if the vehicle 310c attempts a lane change to the primary traveling road, it may avoid collision with the front vehicle 320c, but is supposed to collide with the adjacent vehicle 330c. In order to prevent the above-mentioned collision resulting from a lane change, the path generation unit may generate a path, along which the vehicle can move to an empty space, on the basis of information regarding the vehicle's length and the minimum radius of rotation at the maximum steering angle of the vehicle, thereby preventing an accident resulting from a lane change.

Figure 4:
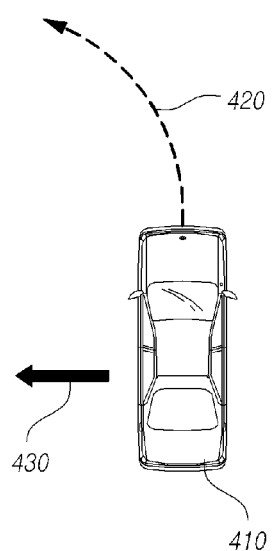
FIG. 4 is a diagram for describing a rotation radius limiting unit according to another embodiment of the present invention.

FIG. 4 is a diagram for describing a rotation radius limiting unit according to another embodiment of the present invention.

A lane change device according to another embodiment of the present invention may further include a maximum steering angle limiting unit, which limits the maximum steering angle on the basis of velocity information acquired using a velocity sensor of the vehicle, and the path generation unit may generate a path, along which the vehicle can move to an empty space, on the basis of the vehicle's width, length, and limited maximum steering angle information.

Referring to FIG. 4, when the vehicle 410 makes a rotational movement at a radius of rotation 420, a centripetal force acts in a direction 430. The relationship between a rotational movement and a centripetal force will be described briefly: a rotational movement of an object requires a centripetal force. The centripetal force necessary for a rotational movement of an object is as given in equation (4) below:

$$F = m\frac{v^2}{r} \quad (4)$$

wherein F is a centripetal force, m is the mass of an object, r is the distance to the axis of rotation, and v is the instantaneous velocity of the object.

If a rotational movement, which needs a centripetal force larger than the centripetal force acting on the object, is attempted, the object comes to escape in the tangential direction of the rotational movement. This will be described in connection with the present invention: if a vehicle 410 having a velocity v makes a rotational movement in the direction 420, a centripetal force acts in the direction 430. The centripetal force may be a frictional force between the vehicle 410 and the road. Therefore, if the centripetal force that can act on the vehicle 410 is limited, and if the required centripetal force for a rotational movement is larger (that is, if the vehicle 410 has a high velocity, or in the case of a rotational movement having a small radius of rotation), the vehicle 410 cannot make the desired rotational movement 420. The above-mentioned case, depending on the situation, may lead to overturning of the vehicle. Therefore, when the vehicle 410 changes lanes, the velocity is measured and, if a predetermined velocity is exceeded, the radius of rotation of the vehicle may be limited, thereby reducing the required centripetal force. The relationship between the velocity and the radius of rotation can be set by experiments. Specifically, the path generation unit according to another embodiment of the present invention may generate a path, along which the vehicle can move to an empty space, on the basis of the maximum steering angle, which is limited by the above-mentioned conditions, and information regarding the vehicle's width and the vehicle's length.

Figure 5:
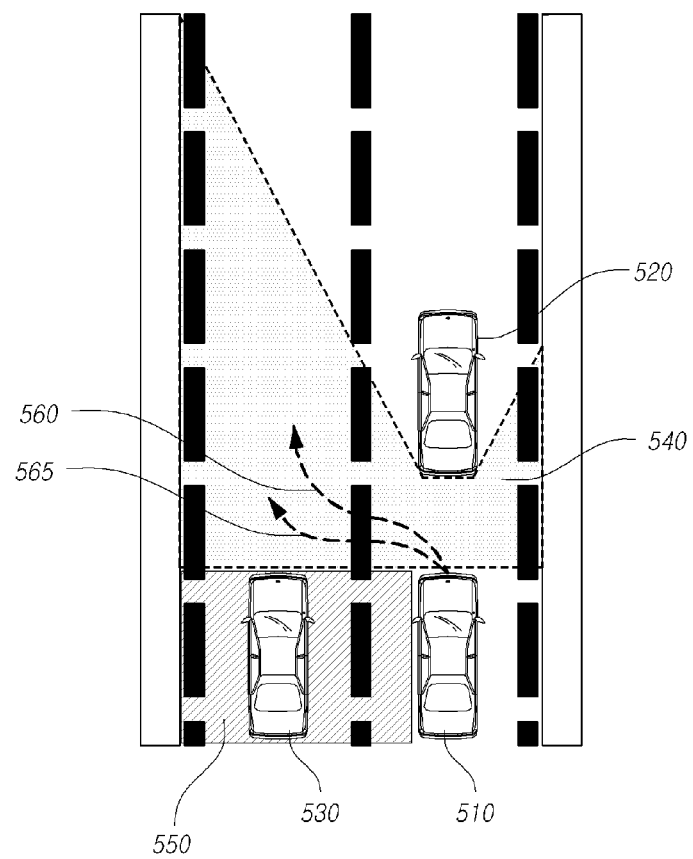
FIG. 5 is a diagram for describing the operation of a lane change device according to still another embodiment of the present invention.

FIG. 5 is a diagram for illustrating the operation of a lane change device according to still another embodiment of the present invention.

The lane change device according to an embodiment of the present invention may further include a side object detection unit, which detects a side object using a camera sensor, and the path generation unit may generate a path, along which the vehicle can move to an empty space without colliding with the side object.

Referring to FIG. 5, three vehicles 510, 520, and 530 are running in the same direction on a road, reference numeral 540 refers to an empty space that can be recognized by the vehicle 510, and reference numeral 550 refers to an area, in which a side object can be detected through the side object detection unit. In addition, if the vehicle 510, which is running behind the vehicle 520 and adjacent to the vehicle 530, makes a lane change to the front of the vehicle 530, the path generation unit can generate a path 560.

To be more specific, the space recognition unit of the vehicle 510 detects front objects only, and cannot recognize the vehicle 530. In this situation, the path generation unit of the vehicle 510 can generate not only the path 560, but also the path 565. If the vehicle 510 moves along the path 565, it may collide with the vehicle 530 depending on the position or movement of the vehicle 530. However, the lane change device according to still another embodiment of the present invention can recognize the position and movement of the vehicle 530, i.e. a side object, existing in the area 550, thereby predicting any possible collision with the vehicle 530 in advance, and the path generation unit can generate the path 560, instead of the path 565, on the basis of such a prediction, thereby preventing any collision with the vehicle 530. Methods for recognizing the position and movement of a vehicle and predicting a collision can be predicted on the basis of experiment data related to the position and movement of a side object, such as the vehicle 530.

Figure 6:
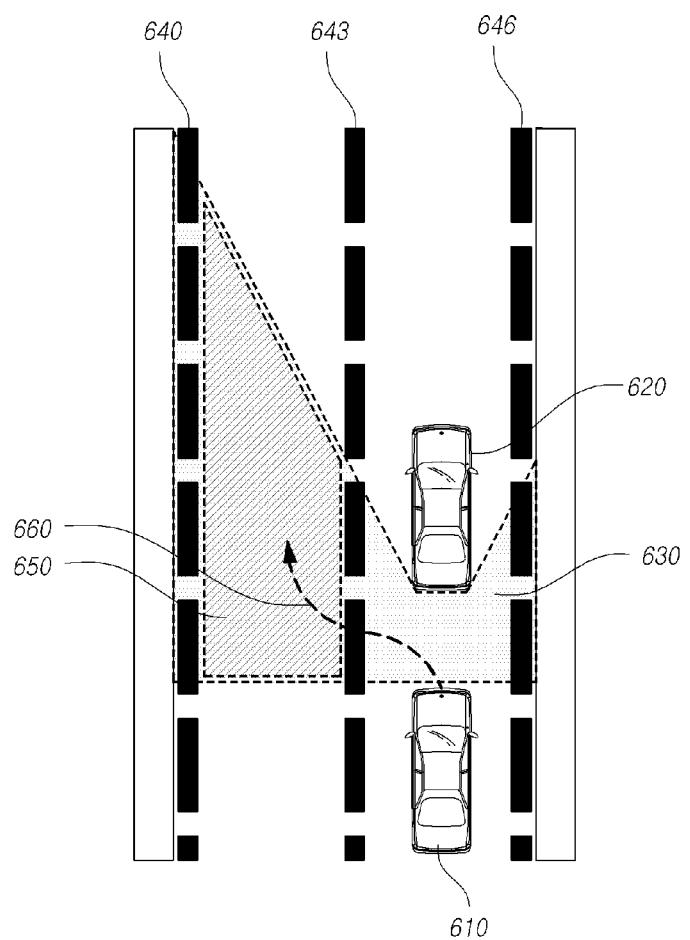
FIG. 6 is a diagram for describing the operation of a lane change device according to still another embodiment of the present invention.

FIG. 6 is a diagram for illustrating the operation of a lane change device according to still another embodiment of the present invention.

A lane change device according to still another embodiment of the present invention may be characterized in that it further includes a traveling road recognition unit, which detects an adjacent lane boundary using a camera sensor and recognizes a traveling road using the detected adjacent lane boundary, and the path generation unit generates a path, along which the vehicle can move to a traveling road inside an empty space.

Referring to FIG. 6, a vehicle 610, which is provided with a lane change device according to still another embodiment of the present invention, and another vehicle 620 are running on a secondary traveling road of a road, which has a median strip and a guard rail. Reference numeral 630 refers to an empty space recognized by the space recognition unit, and reference numerals 640, 643, and 646 refer to adjacent lane boundaries detected using a camera sensor. The lane change device according to still another embodiment of the present invention can recognize a primary traveling road and a secondary traveling road of a road on the basis of the detected adjacent lane boundaries 640, 643, and 646. In addition, the lane change device according to still another embodiment of the present invention can sense an empty space 630 and an area 650, which is constituted by the recognized primary traveling road.

To be specific, the adjacent lane boundaries 640, 643, and 646 can be sensed using one camera sensor. This is because an adjacent lane has predetermined information (color and width) so that, by inputting lane boundary information (color or width) in advance, a lane boundary can be sensed on the basis of the input lane boundary information. In contrast, a front object has no predetermined information, i.e. information cannot be input in advance, and therefore requires two camera devices, not one. That is, recognition of an adjacent lane boundary is made possible either by longitudinal or lateral direction information, but recognition of a front object requires both longitudinal and lateral direction information. Therefore, an empty space 630 may be limited to a specific area, as illustrated in FIG. 6, but adjacent lane boundaries 640, 643, and 646 can be detected with regard to an area wider than the empty space 630. Using the detected adjacent lane boundaries 640, 643, and 646, the space defined by the lane boundary 640 and the next lane boundary 643 can be recognized as a primary traveling road, and the space defined by the lane boundary 643 and the next lane boundary 646 can be recognized as a secondary traveling road. On the basis of this, information regarding the traveling road, on which the own vehicle 610 is running, can also be recognized.

In FIG. 6, the overlapping space 650 between the empty space 530 and the primary traveling road, recognized by the above-mentioned method, can be recognized, and the path generation unit according to still another embodiment of the present invention can generate a path 660, along which the vehicle can move to the area 650.

A lane change device according to another embodiment of the present invention may further include a traveling road recognition unit, which detects an adjacent lane using a camera sensor and recognizes a traveling road using the adjacent lane, and a side object detection unit, which detects a side object using the camera sensor, and the path generation unit may generate a path, along which the vehicle can move to a traveling road inside an empty space without colliding with the side object.

A brief description is as follows: in connection with detection of a path, along which the vehicle can move to an overlapping area between a traveling road recognized by the traveling road recognition unit and an empty space recognized by the space recognition unit, by the path generation unit of a lane change device according to another embodiment of the present invention, the position and movement of a side object may be considered additionally. This may be regarded as an additional application of the situation of FIG. 5 to the situation of FIG. 6.

Figure 7A:
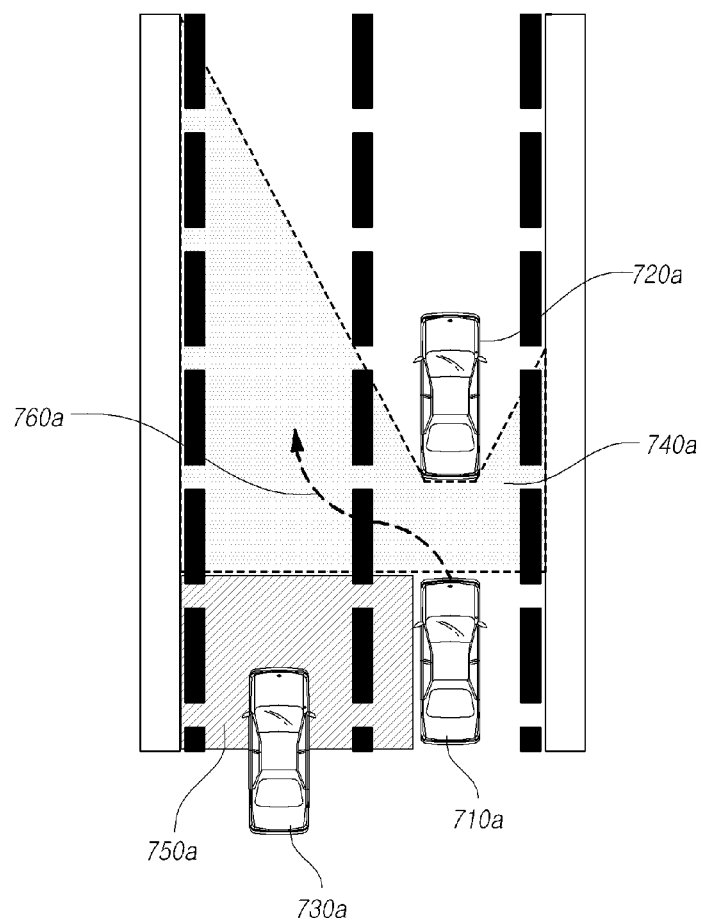
FIG. 7A and FIG. 7B are diagrams illustrating examples for describing the operation of a control unit according to an embodiment of the present invention.
Figure 7B:
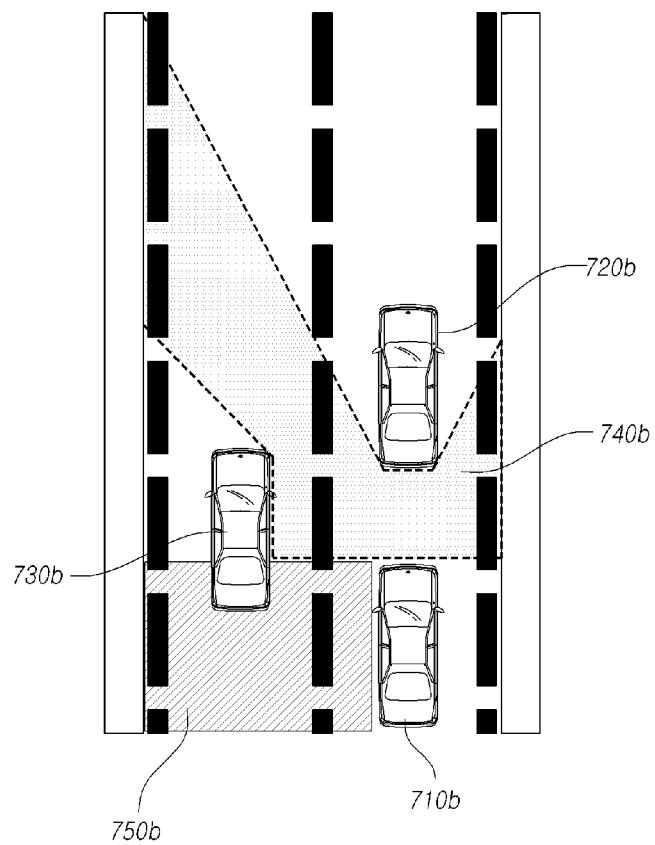

FIG. 7A and FIG. 7B are diagrams illustrating examples for describing the operation of a control unit according to still another embodiment of the present invention.

When the side object detection unit of the lane change device according to an embodiment of the present invention detects a side object on the move, the control unit may calculate an acceleration for the vehicle to move to the generated path without colliding with the side object, and may control the vehicle at the calculated acceleration.

Referring to FIG. 7A, three vehicles 710a, 720a, and 730a are running on a road in the same direction, as in the case of FIG. 5, reference numeral 740a refers to an empty space recognized by the vehicle 710a, and reference numeral 750a refers to an area in which an object can be detected through the side object detection unit. In addition, if the vehicle 710a, which is running behind the vehicle 720a and adjacent to the vehicle 730a, makes a lane change to the front of the vehicle 730a, the path generation unit may generate the path 760a. However, if the vehicles 710a and 720a are running at the same velocity and if the vehicle 730a is running at a higher velocity, the three vehicles 710a, 720a, and 730a reach the positions 710b, 720b, and 735b after a predetermined time t, as illustrated in FIG. 7B, making the vehicle 710a unable to make a lane change. In other words, in order for the vehicle 710 to make a lane change, it is supposed to complete the lane change within the predetermined period of time t.

In order to complete a lane change within a predetermined period of time, the side object detection unit of the lane change device according to still another embodiment of the present invention may detect the position of a side object at a specific time interval. Using information regarding the position of the side object detected at the specific time interval, the control unit can obtain the relative velocity and relative acceleration of the side object. In addition, the control unit can calculate the period of time, during which the own vehicle can make a lane change, on the basis of the relative velocity and the relative acceleration, and can control the acceleration of the own vehicle so as to complete the lane change within the calculated period of time.

FIG. 7A and FIG. 7b illustrate situations in which the own vehicle 710 is regarded as the reference, and may include a situation in which all vehicles 710, 720, and 730 move or only the vehicle 730 moves.

The control unit according to the present invention may calculate the steering angle and the steering torque for moving along the detected path, and may control the vehicle using the calculated steering angle and the steering torque.

To be specific, when the own vehicle equipped with a lane change device according to an embodiment of the present invention moves, an empty space recognized by the space recognition unit changes its position depending on the movement of the vehicle. For example, a front movement of the own vehicle reduces the distance to the empty space, a right movement of the own vehicle moves the empty space to the left, and a left movement of the own vehicle moves the empty space to the right. Using this relationship, the position of movement of the own vehicle can be recognized. According to the recognized position of movement of the own vehicle, the control unit can calculate a steering angle and a steering torque for moving along the path, generated by the path generation unit, and can conduct a control so that the own vehicle can make a lane change along the path generated by the path generation unit. In order to recognize the position of movement of the own vehicle, the lane change device according to an embodiment of the present invention can make a recognition on the basis of not only an empty space, but also any object detected by cameras; therefore, the present invention is not limited to the empty space.

FIG. 8 is a diagram for describing the overall operation according to an embodiment of the present invention.

The space recognition unit of a lane change device according to an embodiment of the present invention may detect a front object using a camera sensor, which is provided on a vehicle, and, by excluding the area of the detected front object from the front monitoring area, may recognize that it is an empty space (S800). A brief description is as follows: the front object can be recognized by obtaining lateral direction information and longitudinal direction information, in connection with the front, using two camera sensors that monitor the front, and by combining the obtained lateral direction information and longitudinal direction information.

The path generation unit of the lane change device according to an embodiment of the present invention generates a path, along which the own vehicle can move to a recognized empty space, on the basis of previously-input information regarding the own vehicle's width, length, and maximum steering angle (S810). A brief description is as follows: the path generation unit according to the present invention can generate a path when the width of the own vehicle is smaller than the width of the recognized empty space, when the radius of rotation of the front wheels of the own vehicle is included in the recognized empty space, and when the radius of rotation of the rear wheels does not overlap with any side object. The path generation unit cannot generate any path if any of the above conditions is not satisfied.

If the path generation unit does not generate any path, that is, if the width of the own vehicle is larger than the width of the recognized empty space, if the radius of rotation of the front wheels of the own vehicle deviates from the recognized empty space, or if the radius of rotation of the rear wheels deviates from the recognized empty space, the driver is provided with an alarm (S820).

When the path generation unit generates a path, that is, when the width of the own vehicle is smaller than the width of the recognized empty space, when the radius of rotation of the front wheels of the own vehicle is included in the recognized empty space, and when the radius of rotation of the rear wheels does not overlap with any side object, the side object recognition unit determines whether a side object exists or not using a side camera provided on the own vehicle (S830). The existence of a side object is considered in connection with generation of a path by the path generation unit, but the movement of the side object is not considered. Therefore, steps S830 and S850 to S880 correspond to a case in which a lane change is made by reflecting the movement of a side object, and may be omitted if necessary. When it is determined in step S830 that no side object exist, the control unit controls the vehicle so as to move along the generated path without considering the vehicle's velocity (S840).

When it is determined in step S830 that a side object exists, the velocity of the own vehicle is compared with that of the side object (S850). The method for comparing the velocity of the own vehicle with that of the side object can be known by comparing positions of the side object, which have been obtained by taking images at a predetermined time interval using a side camera. To be more specific, the position p1 of the side object, which has been measured by the side camera of the own vehicle at time t, is compared with the position p2 of the side object, which has been measured by the same side camera at time t+dt (after time dt has elapsed); it means that, if p2 precedes p1, the side object has a higher velocity than the own vehicle; if p2 and p1 are the same, the side object and the own vehicle have the same velocity; and, if p2 is preceded by p1, the side object has a lower velocity than the own vehicle.

When it is determined in step S850 that the velocity of the own vehicle is higher than that of the side object or is identical to the same, the control unit controls the vehicle so as to move along the generated path without considering the velocity (S840). When it is determined in step S850 that the velocity of the side object is higher than that of the own vehicle, the control unit calculates the relative velocity of the side object (S860). The relative velocity can be calculated using information, which has been used in connection with the method for comparing the velocity of the own vehicle with that of the side object. Specifically, the relative velocity of the side object can be calculated by obtaining the position p1 of the side object, which has been measured by the side camera of the own vehicle at time t, and the position p2 of the side object, which has been measured by the same side camera at time t+dt (after time dt has elapsed), and dividing the change in position p2−p1 of the side object during time dt by time dt. In addition, the control unit can calculate the time tg, during which a lane change can be made, using the relative velocity calculated in step S860. For example, the same can be obtained by dividing the allowance length l of the empty space by the calculated relative velocity v. The allowance length l may be obtained by subtracting the width of the own vehicle from the width of the empty space. The acceleration a for moving along the path is calculated, using the time tg and the allowance length l, as given in equation (5) below (S870):

$$a = \frac{2l}{t_g^2} \tag{5}$$

The acceleration of equation (5) corresponds to a case in which the own vehicle is moving at a constant acceleration for the convenience of the driver. Therefore, equation (5) is not necessarily applied to calculate the acceleration by the lane change device according to an embodiment of the present invention.

The control unit according to an embodiment of the present invention controls the velocity of the own vehicle using on the basis of the acceleration, which has been calculated in step S870, and simultaneously controls the steering angle and the steering torque of the own vehicle so that it moves along the path generated in step S810 (S880).

A lane change method, i.e. an operation performed by the lane change device described with reference to FIG. 1 to FIG. 8, will hereinafter be described briefly.

Figure 9:
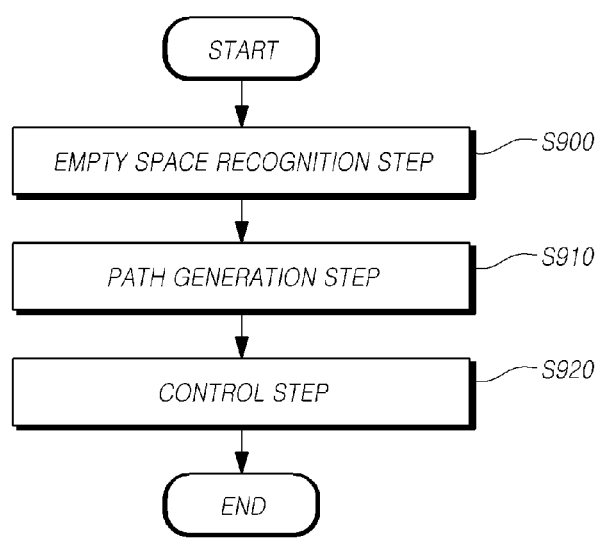
FIG. 9 is a diagram illustrating a flowchart of a lane change method according to an embodiment of the present invention.

FIG. 9 is a diagram illustrating a flowchart of a lane change method according to an embodiment of the present invention.

The lane change method according to an embodiment of the present invention may include a space recognition step of detecting a front object using a camera sensor of a vehicle and recognizing an empty space, in which no detected front object exists; a path generation step of generating a path, along which the vehicle can move to the recognized empty space, on the basis of information regarding the vehicle's width, length, and maximum steering angle; and a control step of controlling the vehicle so as to move along the generated path.

Referring to FIG. 9, the lane change method according to an embodiment of the present invention may include an empty space recognition step (S9000). Specifically, an object in a front camera measurement area is detected using two front camera sensors provided on the vehicle. The two front camera sensors can measure lateral direction information and longitudinal direction information, respectively, and, by combining the measure lateral direction information and longitudinal direction information, can detect an object in the measurement area. An area, from which an area covered by the object detected in the measurement area has been excluded, may be recognized as an empty area. Therefore, the empty space may vary depending on the position in which the two front cameras are provided on the vehicle.

In the empty space recognition step S900, furthermore, images taken of an adjacent lane can be analyzed to determine the coordinate of an empty space among spaces of the adjacent lane, in which no obstacle exists, and a specific target position (x0, y0) can be determined using a lane modeling equation, which is related to the current traveling lane, and a distance of longitudinal movement x0, which is determined from the current vehicle velocity v and the lane change request time t.

The lane change method according to an embodiment of the present invention may include a path generation step (S910). Specifically, a path for lane change can be generated in the path generation step when the width of a recognized empty space is larger than the width of the vehicle, when the minimum radius of rotation of left/right front wheels of the vehicle is included in the recognized empty space, and when the minimum radius of rotation of the left/right rear wheels does not overlap with any adjacent vehicle. The minimum radius of rotation of the front wheels, which is the radius of rotation when the own vehicle is running at the maximum steering angle, and the minimum radius of rotation of the rear wheels, which is the radius of rotation when the own vehicle is running at the maximum steering angle, may be related to the length of the vehicle.

In this case, the path may be set, on the basis of a lateral offset, which is the distance between the camera center and the center of an adjacent lane, so that the vehicle moves along a straight line from the current position to the target position P.

The lane change method according to an embodiment of the present invention may include a control step (S920). In the control step, a control is conducted so that the vehicle moves along the path generated in step S910. Specifically, an empty space recognized in step S900 will be recognized as moving according to the movement of the own vehicle. For example, if the own vehicle moves towards the empty space, the distance between the own vehicle and the empty space will decrease, and the camera sensor will recognize the empty space approaching; and, if the own vehicle moves away from the empty space, the distance between the own vehicle and the empty space will increase, and the camera sensor will recognize the empty space moving away. In addition, if the own vehicle moves to the left, the camera sensor will recognize the empty space moving to the left; and, if the own vehicle moves to the right, the camera sensor will recognize the empty space moving to the left. The movement of the own vehicle can be observed on the basis of such information, and the steering angle of the vehicle can be adjusted in a specific position so that the vehicle moves along the path generated in step S910.

More specifically, in the control step, a steering control for determining the target steering angle $\theta_{fb}$ and a velocity control for adjusting the vehicle velocity or acceleration according to the relative velocity with regard to an adjacent vehicle are simultaneously conducted through a proportional differential feedback, which is based on a front predicted lateral offset error $e_{\tilde{y}}$ and a front predicted heading angle error $e_{\tilde{\phi}}$ (PD control), so that the vehicle completes the lane change along the path within a predetermined period of time (lane change request time t).

Besides, the lane change method according to the present invention can also perform all operations performed by the lane change device according to the present invention, which has been described with reference to FIG. 1 to FIG. 8.

Figure 10:
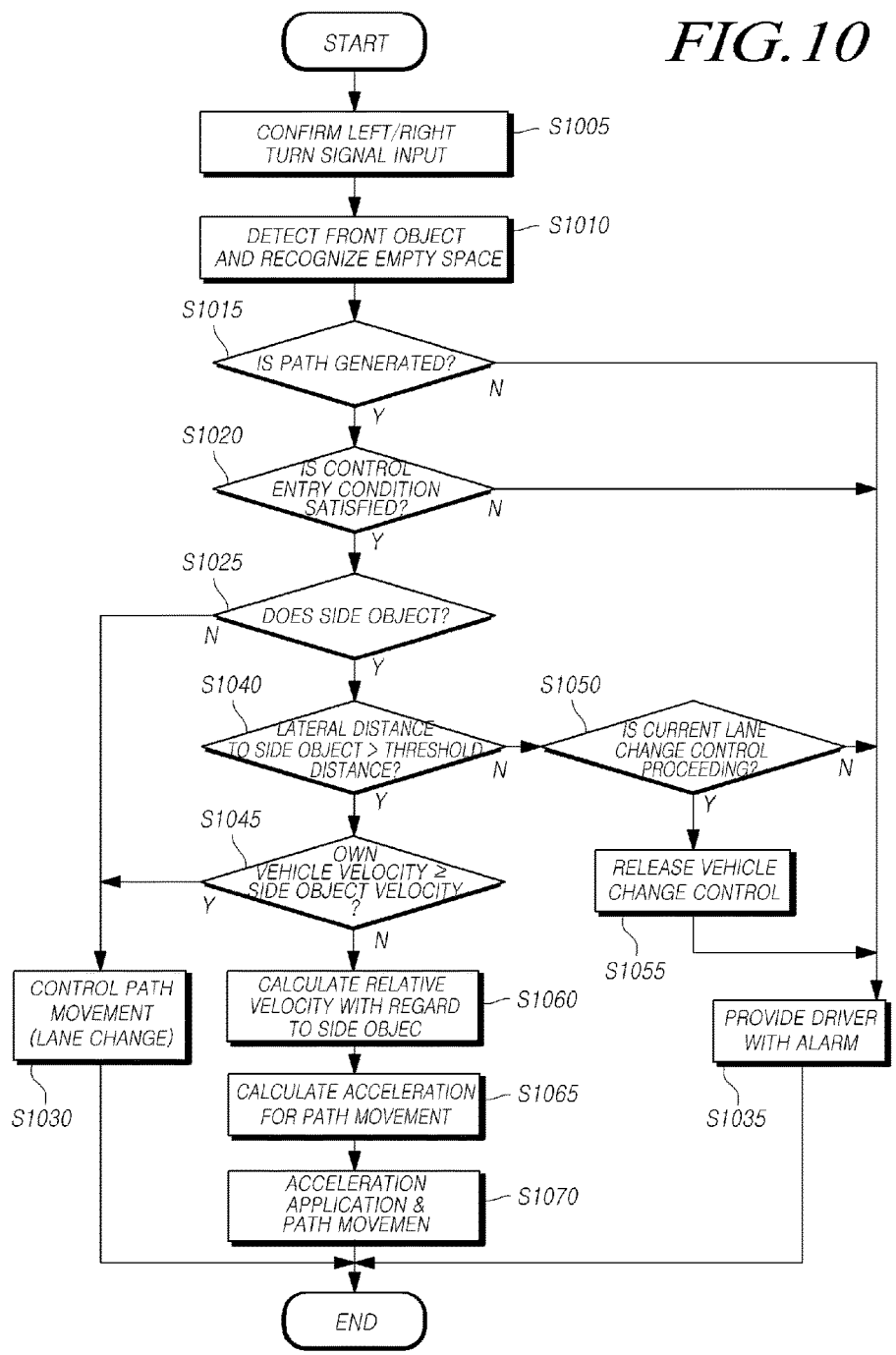
FIG. 10 is a diagram illustrating a flowchart of a lane change method according to still another embodiment of the present invention.

FIG. 10 illustrates a flowchart of a lane change method according to still another embodiment of the present invention.

The lane change method according to the embodiment illustrated in FIG. 10 is generally similar to the scheme of FIG. 9, but is different in terms of additional features of additionally considering a lane change control entry condition and releasing (ending) the lane change control when a specific condition is satisfied during the lane change control.

In the lane control method according to the embodiment illustrated in FIG. 10, it is first confirmed whether a left/right turn signal (turn indicator) of the vehicle is input or not (S1005), and a step of detecting a front object and recognizing an empty space is performed only when the driver has activated a turn signal by manipulating the turn indicator (S1010).

Specifically, images taken by the front camera sensor can be analyzed to determine the coordinate of an empty space among spaces of the adjacent lane, in which no obstacle exists, and a specific target position (x0, y0) can be determined using a lane modeling equation, which is related to the current traveling lane, and a distance of longitudinal movement x0, which is determined from the current vehicle velocity v and the lane change request time t.

Next, a path of movement from the current position to the target position is generated using the minimum radius of rotation of wheels of the vehicle, maximum steering angle information, etc. (S1015). In this case, the path may be set, on the basis of a lateral offset, which is the distance between the camera center and the center of an adjacent lane, so that the vehicle moves along a straight line from the current position to the target position P.

On the other hand, if an obstacle exists in the path of straight movement, or if the path of movement fails to be calculated due to limitations, such as the radius of rotation of wheels or the maximum steering angle, the driver is warned that no path can be generated, and the process is ended (S1035).

When the path of movement is generated, it is then determined whether a condition to enter a lane change control is satisfied or not (S1020).

The lane change control entry condition may be at least one of a turn signal input condition requiring that a turn signal input (turn indicator activation) exist; a vehicle velocity condition requiring that the velocity of the own vehicle be equal to or higher than a predetermined velocity; a distance condition requiring that the distance to a front vehicle in a traveling lane be equal to or larger than a predetermined length; a lane boundary recognition condition requiring that both a lane boundary of a traveling lane and a lane boundary of an adjacent lane be recognized; a lane position condition requiring that the own vehicle be positioned in a predetermined area in a traveling lane; an acceleration condition requiring that the own vehicle's lateral acceleration and longitudinal acceleration be within a predetermined range; a road curvature condition requiring that the road curvature be equal to or lower than a predetermined value; a stable behavior condition requiring that the own vehicle's yaw rate is equal to or lower than a predetermined value; and a driver non-intervention condition requiring that the steering torque be equal to or lower than a predetermined value in the absence of acceleration/braking manipulation.

The turn signal input condition means that the lane change control is performed only when the driver has inputted the turn indicator (turn signal) with a will to change lanes.

The vehicle velocity condition means that the lane change control can be entered only when the currently running velocity is equal to or higher than a predetermined velocity, and is based on the consideration that a lane change at a slow velocity or lower, based on a predetermined standard, is highly likely to cause a collision and a related damage, and therefore is not to be made.

The distance condition means that the lane change control is entered only when the distance between a front vehicle in the traveling lane and the own vehicle is equal to or larger than a predetermined value, because a lane change performed through acceleration, for example, is likely to cause a collision with the front vehicle existing in the traveling lane when the distance to the front vehicle is equal to or smaller than the predetermined value.

The lane boundary recognition condition allows lane change control entry only when both lane boundaries of an adjacent lane, to which a lane change is to be made, are sensed, and is for the purpose of preventing the vehicle from entering a lane, such as the primary lane or the outermost lane, to which no lane change is possible.

For example, when the vehicle is currently running in the outermost lane, and when a request to make a lane change to the right is received, there is no adjacent lane to the right, and both lane boundaries of any adjacent lane fail to be recognized. When both lane boundaries of an adjacent lane, to which a lane change is to be made, are not recognized as such, entry into the lane change control is not allowed.

The lane position condition means that the lane change control is performed only when the own vehicle exists in a predetermined area of the current traveling lane. For example, when a leftward lane change control is to be made, and when the vehicle is running too close to the right area of the traveling lane, the lane change control is not performed because of potential errors related to empty space recognition, path setup, etc.

The acceleration condition and the stable behavior condition are for the purpose of preventing entry into the lane change control when the vehicle's behavior is abnormal, such as when the own vehicle's lateral acceleration or yaw rate is equal to or higher than a predetermined value, making the lateral behavior unstable, or when the longitudinal acceleration is equal to or higher than a predetermined range (abrupt acceleration or deceleration).

The driver non-intervention condition prevents entry into the lane change control when the driver's will of steering or acceleration/deceleration control is confirmed at the point of time to determine the lane change control, for example, when the steering torque is equal to or higher than a predetermined value, or when the pressure of the acceleration pedal or brake pedal is equal to or higher than a predetermined value.

In step S1020, the lane change control may be initiated only when the all of the above lane change control entry conditions are satisfied; however, it is also possible to initiate the lane change control even when one or more of the above lane change control entry conditions are satisfied, in some cases.

On the other hand, when the lane change control entry conditions are satisfied, the side of the own vehicle is sensed to confirm whether a side object exists or not (S1025).

When no side object is sensed in a direction in which a lane change is to be made, the lane change control is performed along the generated path (S1030); and, when a side object exists, the lateral distance between the side object and the own vehicle is measured.

When the lateral distance to the side object in the direction, in which a lane change is to be made, is equal to or lower than a threshold distance (S1040), it is confirmed whether the lane change control is currently operating or not (S1050), the lane change control, which has been operating, is released, and the driver is warned (S1050, S1060).

Furthermore, although not illustrated, release of the lane change control may be performed on the basis of consideration of turn signal input release and driver intervention conditions, besides the lateral distance to the side object.

Specifically, in the process of operating the lane change control according to the present invention, the lane change control that has been operating may be released or ended, and the driver may be warned, when at least one of the following conditions is satisfied: a turn signal ending condition requiring that turn signal input be extinct, a lateral distance condition requiring that the lateral distance to a side object be equal to or smaller than a predetermined value, a driver intervention condition requiring that the steering torque be equal to or higher than a predetermined value or an acceleration/braking manipulation exist, and a lane change completion condition requiring that the lane change be completed.

The driver intervention condition means that the driver's will of steering or acceleration/deceleration control is confirmed, such as when the steering torque is equal to higher than a predetermined value, or when the pressure of the acceleration pedal or the brake pedal is equal to or higher than a predetermined value.

In addition, the lane change completion condition means that, after a lane change in the turn signal direction is sensed, the lane keeping state continues for a predetermined period of time in the changed lane. Specifically, completion of the lane change is recognized only when a lane change determination and a following lane keeping determination are made successively.

The present invention, as described above, is advantageous in that a vehicle's automatic lane change control is made possible by determining the position of an empty space inside an adjacent lane, to which a lane change is to be made, using a camera sensor of the vehicle, setting a path of vehicle movement (lane change path) to the position of the empty space, and controlling the velocity, acceleration, and steering angle of the vehicle so as to move along the path.

Particularly, there is an advantage in that the final empty space, to which the vehicle is to move (target position), can be easily determined solely using a lane modeling equation, which is determined from the distance between the camera center of the vehicle and the center of an adjacent lane (lateral offset), the vehicle's traveling velocity v, and the lane change request time t.

Furthermore, the lane change control is initiated by considering multiple lane change control entry conditions, and the lane change control is released if a predetermined release condition is sensed even during the lane change control, thereby further securing stability and convenience related to the automatic lane change.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:
1. A lane change control device for controlling a vehicle, the device comprising:
a space recognition unit, including a camera sensor, that detects a front object using the camera sensor of the vehicle, recognizes an empty space, in which the front object is not located, inside an adjacent lane that is adjacent to a traveling lane, and determines a target position, to which the vehicle is to move, within the empty space on a basis of a lane modeling equation determined from a lateral offset, which is a distance between a center of the camera sensor and a center of the adjacent lane, a vehicle's traveling velocity (V), and a lane change request time (t);

a control unit that performs a lane change control and controls at least one of the vehicle's steering angle and a vehicle velocity such that the vehicle moves to the target position along a path generated for moving from a current vehicle position to the target position; and a maximum steering angle limiting unit, including a velocity sensor of the vehicle, that limits a maximum steering angle on a basis of velocity information acquired using the velocity sensor of the vehicle, wherein the control unit is configured to move the vehicle along the path to the empty space, on a basis of the vehicle's width, length, and limited maximum steering angle.

2. The lane change control device of claim 1, wherein the control unit initiates the lane change control only when at least one of a turn signal input condition requiring that a turn signal input (turn indicator activation) exist, a vehicle velocity condition requiring that the vehicle's traveling velocity be equal to or higher than a predetermined velocity, a distance condition requiring that a distance to a front vehicle in the traveling lane be equal to or larger than a predetermined length, a lane boundary recognition condition requiring that both a lane boundary of the traveling lane and a lane boundary of the adjacent lane be recognized, a lane position condition requiring that the vehicle be positioned in a predetermined area in the traveling lane, an acceleration condition requiring that vehicle's lateral acceleration and longitudinal acceleration be within a predetermined range, a road curvature condition requiring that a road curvature be equal to or lower than a predetermined value, a stable behavior condition requiring that a vehicle's yaw rate is equal to or lower than a predetermined value, and a driver non-intervention condition requiring that a steering torque be equal to or lower than a predetermined value in an absence of acceleration/braking manipulation, is satisfied.

3. The lane change control device of claim 1, wherein the control unit releases the lane change control that has been operating when one of a turn signal ending condition requiring that turn signal input be extinct, a lateral distance condition requiring that a lateral distance to a side object be equal to or smaller than a predetermined value, and a driver intervention condition requiring that a steering torque be equal to or higher than a predetermined value or an acceleration/braking manipulation exist, is satisfied while performing the lane change control.

4. The lane change control device of claim 3, wherein the lane change control device further comprises side camera sensor to detect a side object, and the control unit calculates an acceleration for moving along the path without colliding with the detected side object, on a basis of a relative velocity with regard to the detected side object, and controls the acceleration of the vehicle.

5. The lane change control device of claim 4, wherein the control unit calculates a target steering angle for moving along the path, and the target steering angle is calculated by a proportional deviation (PD) feedback control that attenuates a front predicted lateral offset error of the vehicle with regard to the path and a front predicted heading angle error with regard to the path.

6. The lane change control device of claim 5, wherein the control unit provides a driver with an alarm when at least one of a case in which the path has not been generated, a case in which the lane change control release has been performed, and a case in which the lane change control entry condition has not been satisfied, is satisfied.

7. A lane change control method, for controlling a vehicle, the method comprising:

detecting a front object using two front cameras of the vehicle;

recognizing an empty space, in which the front object is not locate, inside an adjacent lane that is adjacent to a traveling lane;

determining a target position, to which the vehicle is to move, within the empty space on a basis of a lane modeling equation determined from a lateral offset, which is a distance between a center of the front cameras and a center of the adjacent lane, a vehicle's traveling velocity (V), and a lane change request time (t);

limiting a maximum steering angle on a basis of velocity information acquired using a velocity sensor of the vehicle;

generating a path for moving from a current vehicle position to the target position, on a basis of the vehicle's width, length, and limited maximum steering angle; and controlling, by a control unit, at least one of the vehicle's steering angle and a vehicle velocity to perform a lane change control such that the vehicle moves to the target position along the path.

8. The lane change control method of claim 7, wherein the performing lane change control further comprises determining a control entry by initiating the lane change control only when at least one of a turn signal input condition requiring that a turn signal input (turn indicator activation) exist, a vehicle velocity condition requiring that the vehicle's traveling velocity be equal to or higher than a predetermined velocity, a distance condition requiring that a distance to a front vehicle in the traveling lane be equal to or larger than a predetermined length, a lane boundary recognition condition requiring that both a lane boundary of the traveling lane and a lane boundary of the adjacent lane be recognized, a lane position condition requiring that the vehicle be positioned in a predetermined area in the traveling lane, an acceleration condition requiring that vehicle's lateral acceleration and longitudinal acceleration be within a predetermined range, a road curvature condition requiring that a road curvature be equal to or lower than a predetermined value, a stable behavior condition requiring that a vehicle's yaw rate is equal to or lower than a predetermined value, and a driver non-intervention condition requiring that a steering torque be equal to or lower than a predetermined value in an absence of acceleration/braking manipulation, is satisfied.

9. The lane change control method of claim 8, wherein the performing control further comprises releasing control by releasing the lane change control that has been operating when one of a turn signal ending condition requiring that turn signal input be extinct, a lateral distance condition requiring that a lateral distance to a side object be equal to or smaller than a predetermined value, and a driver intervention condition requiring that a steering torque be equal to or higher than a predetermined value or an acceleration/braking manipulation exist, is satisfied while performing the lane change control.

10. The lane change control method of claim 9, wherein, in the performing control, an acceleration for moving along the path without colliding with a side object, which has been detected using a side camera, is calculated, on a basis of a relative velocity with regard to the side object, and controls the acceleration of the vehicle.

11. The lane change control method of claim 10, wherein, in the performing control, a target steering angle for moving along the path is calculated, and the target steering angle is calculated by a proportional deviation (PD) feedback control that attenuates a front predicted lateral offset error with regard to the path and a front predicted heading angle error with regard to the path.

12. The lane change control method of claim 11, wherein the method further comprises providing an alarm to a driver when at least one of a case in which the path has not been generated, a case in which the lane change control release has been performed, and a case in which the lane change control entry condition has not been satisfied, is satisfied.

* * * * *

UNITED STATES PATENT AND TRADEMARK OFFICE
CERTIFICATE OF CORRECTION

PATENT NO. : 9,643,650 B2  
APPLICATION NO. : 14/983469  
DATED : May 9, 2017  
INVENTOR(S) : Sang Kyun Sim Page 1 of 1

It is certified that error appears in the above-identified patent and that said Letters Patent is hereby corrected as shown below:

On the Title Page

Item (73):  
The Assignee's Country "(KP)" should read "(KR)".

Signed and Sealed this  
Twenty-seventh Day of June, 2017

Joseph Matal  
*Performing the Functions and Duties of the*  
*Under Secretary of Commerce for Intellectual Property and*  
*Director of the United States Patent and Trademark Office*